United States Patent
Croft

(10) Patent No.: US 6,312,560 B1
(45) Date of Patent: Nov. 6, 2001

(54) USE OF ALKYLENEAMINES FOR ENHANCING LIME MUD DEWATERING

(75) Inventor: Alan P. Croft, Lake Jackson, TX (US)

(73) Assignee: Huntsman Ethyleneamines Ltd., Austin, TX (US)

( * ) Notice: Subject to any disclaimer, the term of this patent is extended or adjusted under 35 U.S.C. 154(b) by 0 days.

(21) Appl. No.: 09/360,301

(22) Filed: Jul. 23, 1999

(51) Int. Cl.$^7$ .................................................. D21C 11/04
(52) U.S. Cl. ........................................ 162/30.11; 210/706
(58) Field of Search .................................. 162/29, 30.11; 210/386, 393, 410, 714, 728, 727, 778

(56) References Cited

U.S. PATENT DOCUMENTS

| | | | |
|---|---|---|---|
| 3,617,440 | 11/1971 | Strother, Jr. | 162/168 |
| 3,890,227 | * 6/1975 | Merchant, Jr. | 210/51 |
| 4,026,991 | 5/1977 | Chamberlain | 423/177 |
| 4,062,779 | * 12/1977 | Nakamura et al. | 210/386 |
| 4,559,143 | * 12/1985 | Asada et al. | 210/714 |
| 5,057,467 | * 10/1991 | Croft | 501/148 |
| 5,151,130 | 9/1992 | Croft et al. | 106/778 |
| 5,347,071 | * 9/1994 | Moriya et al. | 588/256 |
| 5,641,385 | 6/1997 | Croft et al. | 162/60 |
| 5,705,031 | 1/1998 | Angevine | 162/30.11 |
| 5,846,433 | * 12/1998 | Sorensen et al. | 210/709 |

FOREIGN PATENT DOCUMENTS

| | | | |
|---|---|---|---|
| 98 55685 | 12/1998 | (WO) | D21C/11/04 |

OTHER PUBLICATIONS

Pulp and Paper: Chemistry and Chemical Technology 3$^{rd}$ ed., vol. 1, (1980), pp. 241–291 and 504–567.

Gary A. Smook, :"Handbook for Pulp and Paper Technologists", Second Edition, Angus Wilde Publications, pp. 74–83 and 133–162 (1992).

Japanese Abstract XP–002144198.

International Search Reported dated Aug. 14, 2000 issued by the EPO acting as the International Searching Authority in PCT/US00/12685.

* cited by examiner

*Primary Examiner*—Dean T. Nguyen
(74) *Attorney, Agent, or Firm*—Russell R. Stolle; Ron D. Brown

(57) ABSTRACT

A process for dewatering lime mud in a kraft pulping process is described. The process includes an improvement which comprises adding an effective amount of an alkyleneamine to the lime mud prior to filtration. The preferred alkyleneamine is ethyleneamine, that is, an amine having at least one —($CR_2$—$CR_2$—NH—)— unit wherein each R independently is H or an alkyl (straight, branched or cyclic) group of from about 1 to about 10 carbon atoms. Ethyleneamines include ethylenediamine, diethylenetriamine, triethylenediamine, triethylenetetramine, tetraethylenepentamine, piperazine, aminoethylpiperazine, and ethyleneamine mixtures such as mixtures of ethyleneamine oligomers having an average molecular weight of about 200–500.

11 Claims, No Drawings

USE OF ALKYLENEAMINES FOR ENHANCING LIME MUD DEWATERING

BACKGROUND OF THE INVENTION

Processes of preparing cellulosic pulps including kraft pulping process are within the skill in the art for instance as discussed in Casey, *Pulp and Paper; Chemistry and Chemical Technology*, 3rd ed., vol. 1, (1980) especially pages 291–491 and 504–567. In chemical pulps, the wood or other cellulose source is advantageously separated into pulp with the help of chemicals. Two principal chemical pulping methods are in use: soda process and kraft process. The soda process utilizes a strongly alkaline solution of sodium hydroxide to digest wood chips. Kraft pulping process utilizes sulfate materials (reduced to sulfites in the furnace) and hydroxides. The kraft pulping process is widely used these days for producing pulp for subsequent processing to produce paper for instance as discussed in Gary A. Smook, "Handbook for Pulp and Paper Technologists", Second Edition, Angus Wilde Publications, pp. 74–83 and 133–162 (1992).

In this process, wood chips are cooked (digested) under conditions of heat and pressure using "white liquor" containing sodium hydroxide (NaOH) and sodium sulfide ($Na_2S$) to release cellulose fibers from other components such as lignin. After digestion, fibers are commonly released under pressure into a tank in a process referred to as blowing or blowdown. Then the pulp is washed to remove spent chemicals, lignin and other organic chemicals. The liquid removed from the pulp is referred to as "black liquor" and contains about 25 percent dissolved solids. The black liquor resulting from the washing stage is concentrated by evaporation to a desired concentration and burned to reclaim the inorganic chemicals and provide fuel value. The organic materials are advantageously incinerated to yield an inorganic smelt of sodium carbonate and sodium sulfide. The resulting inorganic smelt is dissolved to form "green liquor". Clarified green liquor is reacted with lime (CaO) in a slaker (causticizer). This produces the white liquor (which is reused in the digestion step) and lime mud. The lime mud is then recalcined in a heated lime kiln to recover lime (CaO) which is used in a slaker.

An important step in the processing of lime mud is lime mud dewatering. This is typically done using a suitable filtration means such as vacuum drum filter. Typically, a rotary vacuum drum filter is used for dewatering lime mud and washing it just prior to its entrance into the lime kiln. Lime mud from storage is diluted to 25–35 percent solids and pumped to the "precoat" filter. This filter operates at 15–20 inches of vacuum (about 9 psia). The drum is covered with a screen made of stainless steel or plastic fiber (typically 150 mesh). A cake of lime mud builds up on the screen as the drum turns, and a doctor blade is fixed at a distance of ⅜–⅝ inch (about 0.94–1.56 cm.) from the screen. Consequently, a layer of lime mud remains on the screen continually and acts as the filter medium for the lime mud. Thus the name "precoat" filter. This "precoat" enhances the filter's ability to remove fine particles during the filtration process. During the filtration, as the lime mud builds up, the doctor blade removes it and the dewatered lime mud falls onto a screw feeder which transports it to the feed end of the kiln. Dewatered lime mud is typically about 65–75 percent solids. The temperature at the pre-coat filter is important. Best results are seen with temperatures of about 70° C., while cold temperatures can reduce filter capacity by 10 percent or more.

However, many filters are not efficient and the use of dewatering additives would be desirable to facilitate removal of water from and improve filtration of the lime. The use of dewatering additives in the lime mud processing would not only improve filtration of lime mud but would also result in less energy required for heating the lime kiln to convert lime mud to lime.

The main benefit of using lime mud dewatering additives would be the reduction of the water content of lime mud exiting the filter. Additional benefits may be any of the following: reduction of fuel consumption in the lime kiln resulting in the energy savings; reduction of formation of "rings" and "balls" in the kiln (better water removal results in greater removal of the water-soluble salts responsible for these formations in the kiln); reduction of sulfur stack emissions from the process (much of sulfur is present at this point in the process as sodium salts; better dewatering results in more efficient sulfur removal); increased lime mud filter runability (a drier filter cake results in less plugging of the screw feed that transports dewatered lime mud to the kiln resulting in lower maintenance and less needed cleanup).

Thus, there is a clear need in the cellulosic pulp industry for an additive which will enhance dewatering of lime mud.

SUMMARY OF THE INVENTION

It has now been discovered that the use of alkyleneamines improves reduction of the water content of lime mud exiting the filter and improves on one or more of the aforementioned benefits.

The present invention concerns an improved process for dewatering lime mud wherein the improvement comprises adding an effective amount of an alkyleneamine to lime mud prior to filtration.

In another aspect, the present invention concerns an improvement in a kraft pulping process wherein lime mud is filtered to remove excess of water, the improvement comprising the addition of an effective amount of an alkyleneamine to lime mud prior to filtration.

In yet another aspect, the present invention concerns a lime mud dewatering composition comprising lime mud and an effective amount of an alkyleneamine.

DETAILED DESCRIPTION OF THE INVENTION

This invention is applicable to any lime mud and particularly to lime mud in the spent chemicals recovery cycle of the kraft cellulosic pulping process.

The term alkyleneamine is used to mean an amine having at least one alkyleneamine unit or repeating alkyleneamine units such as, for example, ethyleneamine, propyleneamine, and butyleneamine. The preferred alkyleneamine is ethyleneamine, that is, an amine having at least one ethyleneamine unit or repeating ethyleneamine units. An ethyleneamine unit is —($CR_2$—$CR_2$—NH—)— where R is H or an alkyl (straight, branched or cyclic) group, preferably H, but if alkyl of from about 1 to about 10 carbon atoms. Ethyleneamines have at least two amine groups, which groups are primary or secondary amine groups; tertiary amine groups are optionally also present. Thus, ethyleneamines include ethylenediamine (EDA), diethylenetriamine (DETA), triethylenediamine (TEDA), triethylenetetramine (TETA), tetraethylenepentamine (TEPA), piperazine (PIP), aminoethylpiperazine (AEP), ethyleneamine mixtures such as mixtures of ethyleneamine oligomers having an average molecular weight of about 250–500 commercially available from The Dow Chemical Company under the trade designation Ethyleneamine E-100 (E-100), and other mixtures thereof. In the case of ethyleneamines having isomers, one isomer or a mixture of isomers is suitably used in the practice of the invention. It is preferred that the ethyleneamine be soluble in the aqueous lime mud composition; therefore, the molecular weight or average molecular weight in the case of a mixture of the ethyleneamines is preferably sufficiently low to retain solubility in the aqueous lime mud composition, preferably in lime mud water slurry. More preferably, the molecular weight or average molecular weight of the alkyleneamine is from about 50 to about 1000, more preferably from about 100 to about 500, most preferably from about 200 to about 500. Among ethyleneamines, ethylenediamine, diethylenetriamine, triethylenetetramine, tetraethylenepentamine, and Ethyleneamine E-100 ethyleneamine oligomers mixtures are preferred with ethylenediamine, diethylenetriamine, triethylenetetramine, and tetraethylenepentamine more preferred and Ethyleneamine E-100 ethyleneamine oligomers mixtures most preferred.

Conditions of use are not critical to the invention. However, dewatering is expected within the art to be more efficient at elevated temperatures than at temperatures at or below room temperature. Best dewatering results are seen with temperatures of about 70° C. to about 90° C., while cold temperatures can reduce filter capacity by 10 percent or more. A temperature of about 77° C. is conveniently used in dewatering of lime mud.

The alkyleneamines are used in any amount effective to enhance dewatering of lime mud. The concentration of the alkyleneamines which has been found to be effective for enhancing dewatering lime mud is typically in the range of from about 10 to about 10,000, preferably from about 100 to about 5,000, most preferably from about 500 to about 3,000, parts per million by weight (ppm) based on the weight of lime mud composition.

The alkyleneamine is conveniently added to the lime mud composition prior to the filtration thereof. Typically, the alkyleneamine is added to lime mud coming out of storage or through the water showers that are directed upon the filter cake on the lime mud filter.

The use of alkyleneamine dewatering additive can increase the percent of solids by 3–5 percent in the lime mud having solids content above 70 percent and by more than 10 percent in the lime mud having solids content of 60–65 percent.

The following examples are offered to illustrate but not limit the invention. All ratios, percentages and parts are by weight unless otherwise indicated.

EXAMPLES

The effectiveness of alkyleneamines to improve dewatering of lime mud was evaluated in a lab scale test using the Baroid filter press. In this small lab-scale press which is often used for evaluation of dewatering processes, simple filtration occurs under pressure. The pressure is maintained by using a regulated nitrogen supply. A slurry to be filtered is prepared and added to the press, which is then closed and pressurized. The volume of filtrate collected during a set time period is noted as the filtration rate for the slurry.

Lime mud slurries (30 percent solids) were prepared either with or without an alkyleneamine incorporated. An initial slurry was filtered in the Baroid filter press (at 10 psig pressure) to produce a filter cake to act as a filter medium for subsequent filtration of a second lime mud slurry. This is analogous to the use of a precoat on the vacuum drum filter used in the kraft process. The volume of filtrate collected over a 10 seconds test period during the second filtration was used as a measure of filtration rate. Multiple experimental replications were undertaken to minimize the variation often noted when heterogeneous materials (like lime mud slurries) are subjected to tests of this nature.

Lime Mud Slurry (30 percent solids) Preparation

Lime mud (46.74 g., 80.23 percent solids) was weighed into a tared 250 ml. beaker containing a 6 inch glass stirring rod. If no alkyleneamine was to be added (comparative example), deionized water was added to achieve a total net weight of 125.0 g (exclusive of the weight of the beaker and stirring rod). The glass stirring rod was used to stir the mixture until uniform. If an alkyleneamine was to be added (examples of the invention), deionized water was added until the net weight about 80 g was reached and the mixture was stirred with the stirring rod. The addition was followed by the addition of the desired quantity of an alkyleneamine as a 10 percent aqueous solution (for example, a 2000 ppm addition level, based on lime mud solids, required adding 0.75 ml. of a 10 percent solution of the alkyleneamine). Finally, deionized water was added until a total net weight of 125.0 g was achieved. The mixture is then stirred using the glass stirring rod until uniform.

The Baroid Press Initial Assembly and Loading

The filter press was assembled with the body of the filter press placed so that its bottom (the open face with two small holes in the rim) was facing up. A 325 mesh screen, with the flat side down, was inserted into the body of the press on top of the O-ring. An O-ring was placed on the bottom cap. The bottom cap was inserted into the body of the filter press and the set screws tightened using an allen wrench. Then the bottom outlet valve was inserted into the bottom cap and closed. Now the filter press body was inverted and placed in a ring stand clamp. While stirring, the lime mud mixture was poured into the filter press, using a small rubber spatula to remove any residual lime mud from the sides of the beaker. A 325 mesh screen and the top cap of the filter press were installed using the same method previously used for the bottom cap. Then the top outlet valve was inserted into the top cap and closed.

Initial filtration was conducted as follows

A regulated nitrogen line was attached on the top inlet valve on the body of the filter press. The nitrogen pressure was set to 10 psig, but the nitrogen supply valve to the nitrogen line was closed. The top inlet valve on the filter press was then opened. A 500 ml. disposable beaker was placed under the bottom outlet valve, and the bottom outlet valve opened. At this point, the nitrogen supply valve was opened, causing the filtrate to leave the filter press and be collected in disposable beaker. After the flow through the press was no longer steady, a timer is started and the nitrogen flow through the filter press continued for additional 5 minutes to ensure the initial mat is formed. At this point the nitrogen supply valve, and the bottom outlet valves were closed Baroid Filter Press Second Assembly and Loading The top cap of the filter press and screen were removed. While stirring, a second lime mud slurry was poured into the filter press, on top of the filter cake already present. A small rubber spatula was again used to remove any residual lime mud from the sides of the beaker. The top cap and screen were reinstalled using the same method as described above. Then the top inlet valve was inserted into the top cap and closed. A regulated nitrogen line was attached on the top inlet valve on the body of the filter press, taking care to ensure that the nitrogen pressure was set to 10 psig, but that the nitrogen supply valve to nitrogen line was closed. The top inlet valve on the filter press was then opened and a 25 ml. graduate cylinder placed under the bottom outlet valve. At this point, the bottom outlet valve and the nitrogen supply valve were simultaneously opened and a 10 second timer started, causing the filtrate to leave the filter press and be collected in the graduated cylinder during the 10 seconds collection period. The nitrogen supply valve, the top inlet valve, and the bottom outlet valves were closed. Finally, the volume of filtrate collected was recorded.

Multiple dewatering tests were conducted at ambient temperature both with lime mud slurry containing no ethyleneamine and each lime mud slurry containing an ethyleneamine. The results are provided in Table 1 below wherein the volumes of filtrate collected during the 10 second test period (given as the average value of tests run), together with the calculated percent improvement in dewatering rates, are given.

TABLE 1

Effectiveness of Various Alkyleneamines as Lime Mud Dewatering Additives

| Example | Additive | Additive Concentration (ppm) | Filtrate Volume (ml) | Percent Improvement |
|---|---|---|---|---|
| C-1 | None | 0 | 11.6 | 0 |
| 1 | EDA | 2000 | 12.1 | 6.9 |
| 2 | DETA | 2000 | 11.7 | 0.9 |
| 3 | TETA | 2000 | 11.9 | 2.6 |
| 4 | TEPA | 2000 | 12.2 | 5.2 |
| 5 | E-100 | 1000 | 12.7 | 9.5 |
| 6 | E-100 | 1500 | 12.2 | 5.2 |
| 7 | E-100 | 2000 | 14.0 | 20.7 |
| 8 | E-100 | 2500 | 12.9 | 11.2 |

Note: C-1 is not an example of the present invention

As can be seen from the data provided in Table 1, all tested ethyleneamines improved lime mud dewatering. E-100 demonstrated to be the most effective in dewatering lime mud since it improved dewatering 20.7 percent at 2000 ppm and 11.2 percent at 2500 ppm dose levels. In general there is some trend toward increased dewatering performance with increasing molecular weight of the homologs in the ethyleneamine series. However, no clear relationship of alkyleneamine concentration to percent improvement of lime mud dewatering can be elucidated. Although it appears that 2000 ppm additive level is optimal for use at ambient temperature, another amount of an ethyleneamine may be optimal at an elevated temperature.

What is claimed is:

1. In a process for dewatering lime mud, the improvement which comprises adding an effective amount of an alkyleneamine to enhance dewatering of lime mud to the lime mud prior to filtration.

2. The process of claim 1 wherein the alkyleneamine is an ethyleneamine.

3. The process of claim 2 wherein the ethyleneamine has at least one —($CR_2$—$CR_2$—NH—)— unit wherein each R is independently selected from H or alkyl group of from 1 to about 10 carbon atoms.

4. The process of claim 3 wherein the ethyleneamine has a molecular weight of from about 50 to about 1000.

5. The process of claim 2 wherein the ethyleneamine is selected from ethylenediamine, diethylenetriamine, triethylenetetramine, tetraethylenepentamine, mixtures of ethyleneamine oligomers having an average molecular weight of about 200–500, and other mixtures thereof.

6. The process of claim 5 wherein the ethyleneamine is selected from ethylenediamine, tetraethylenepentamine, and mixtures of ethyleneamine oligomers having an average molecular weight of about 200–500.

7. The process of claim 6 wherein the ethyleneamine is a mixture of ethyleneamine oligomers having an average molecular weight of about 200–500.

8. The process of claim 1 wherein the alkyleneamine is used in an amount of from about 10 to about 10,000 ppm.

9. The process of claim 1 wherein the alkyleneamine is used in an amount of from about 100 to about 5,000 ppm.

10. The process of claim 8 wherein the ethyleneamine is used in an amount of from about 500 to about 3,000 ppm.

11. An improvement in a kraft pulping process wherein spent chemicals are recovered and recycled into the pulping process, the improvement comprising use of an effective amount of an alkyleneamine to enhance dewatering of lime mud.

* * * * *